United States Patent [19]

Kuroishi et al.

[11] Patent Number: 5,173,517
[45] Date of Patent: Dec. 22, 1992

[54] RIGID POLYURETHANE FOAM AND HEAT INSULATOR OBTAINED THEREFROM

[75] Inventors: Kazuyoshi Kuroishi; Reishi Naka; Isao Kobayashi, all of Tochigi, Japan

[73] Assignee: Hitachi, Ltd., Tokyo, Japan

[21] Appl. No.: 630,186

[22] Filed: Dec. 19, 1990

[30] Foreign Application Priority Data

Sep. 4, 1989 [JP] Japan .................................. 1-229007

[51] Int. Cl.⁵ .............................................. C08G 18/00
[52] U.S. Cl. ...................................... 521/166; 521/50; 521/155; 521/157; 521/163; 521/164; 521/177
[58] Field of Search ................. 521/136, 181, 50, 166, 521/155, 157, 163, 164, 177

[56] References Cited

U.S. PATENT DOCUMENTS 5,008,297 4/1991 Maruyama et al. ................ 521/136

Primary Examiner—John Kight, III
Assistant Examiner—Dvc Truong
Attorney, Agent, or Firm—Antonelli, Terry, Stout & Kraus

[57] ABSTRACT

A rigid polyurethane foam obtained by foaming a special polyol component and an isocyanate component using only water as a blowing agent has balanced excellent properties including a remarkably low density and a low thermal conductivity and is suitable for use as a heat insulator, particularly in a refrigerator.

26 Claims, 1 Drawing Sheet

RIGID POLYURETHANE FOAM AND HEAT INSULATOR OBTAINED THEREFROM

BACKGROUND OF THE INVENTION

This invention relates to a closed-cell rigid polyurethane foam having a remarkably low density, a low thermal conductivity and well balanced various properties obtained by using only water as a blowing agent, a process for producing such a polyurethane foam, and use thereof as heat insulator, for example, in refrigerators.

Rigid polyurethane foams are usually obtained by reacting a polyol component and an isocyanate component in the presence of a blowing agent, a reaction catalyst, and a foam stabilizer. Heretofore, as the blowing agent, there have been used fluoro carbon type blowing agents having low boiling points such as trichloromonofluoromethane ($CCl_3F$), etc. Buf $CCl_3F$ is one of hardly decomposable chlorofluorocarbons (CFC) which are chlorofluoro substituted hydrocarbons. It has recently been found that when such a hardly decomposable CFC is released into the atmosphere, it acts to destroy the ozone layer in the stratosphere or cause an earth surface temperature rise due to a so-called hothouse effect. Thus, the use of such a CFC becomes a serious global environmental pollution problem in recent years. In the future, the production and consumption of the hardly decomposable CFC's are to be reduced stepwise Thus, how to reduce their use becomes a worldwide problem.

On the other hand, it has long been known in the art that water is usable as one component of blowing agent. For example, Japanese Patent Unexamined Publication No. 53-9797 proposes the use of a fluorochlorinated hydrocarbon and water (0.2 to 3 parts by weight per 100 parts by weight of polyol component) as a blowing agent. But the use of water causes a serious problem in that its use even in a small amount caused deterioration of heat insulating properties or formation of gas boils in the product, resulting in unbalance of the properties required for a rigid urethane foam. Japanese Patent Unexamined Publication Nos. 59-84913 and 62-81414 disclose the co-use of water and CFC as a blowing agent. But in order to maintain good properties required, the amount of water is limited, for example, to less than 1% by weight in the blowing agent.

Thus, the use of water alone as the blowing agent has not been realized in industrial production of rigid polyurethane foams.

SUMMARY OF THE INVENTION

It is an object of the present invention to provide a rigid polyurethane foam having excellent properties as well as excellent heat insulating properties and excellent dimensional stability using only water as the blowing agent, not using fluorocarbon blowing agents including substitutes therefor. It is another object of the present invention to provide a process for producing such a rigid polyurethane foam. It is a further object of the present invention to provide a process for using such a rigid polyurethane foam as a heat insulator, for example, in a refrigerator.

The present invention provides a rigid polyurethane foam produced by reacting a polyol component with an isocyanate component using water as a blowing agent, said polyol component being a mixed polyol composition comprising
(a) 30 to 55% by weight of a polyether polyol obtained by adding ethylene oxide and propylene oxide to an aromatic amine,
(b) 10 to 20% by weight of a polyether polyol obtained by adding propylene oxide to an alcoholic amine,
(c) 5 to 15% by weight of a polyether polyol obtained by adding propylene oxide to an octafunctional polyol,
(d) 10 to 35% by weight of a polyether polyol obtained by adding propylene oxide to a tetrafunctional polyol,
(e) 0 to 15% by weight of a polyester polyol obtained by condensing diethylene glycol and dipropylene glycol with a polycarboxylic acid or an anhydride thereof, and
(f) 0 to 25% by weight of a polyether polyol obtained by adding ethylene oxide and propylene oxide to an aliphatic amine.

The present invention further provides a process for producing a rigid polyurethane foam which comprises reacting a polyol component with an isocyanate component in the presence of water as a blowing agent, a reaction catalyst and a foam stabilizer, said polyol component being a mixed polyol composition comprising
(a) 30 to 55% by weight of a polyether polyol obtained by adding ethylene oxide and propylene oxide to an aromatic amine,
(b) 10 to 20% by weight of a polyether polyol obtained by adding propylene oxide to an alcoholic amine,
(c) 5 to 15% by weight of a polyether polyol obtained by adding propylene oxide to an octafunctional polyol,
(d) 10 to 35% by weight of a polyether polyol obtained by adding propylene oxide to a tetrafunctional polyol,
(e) 0 to 15% by weight of a polyester polyol obtained by condensing diethylene glycol and dipropylene glycol with a polycarboxylic acid or an anhydride thereof, and
(f) 0 to 25% by weight of a polyether polyol obtained by adding ethylene oxide and propylene oxide to an aliphatic amine.

This invention still further provides a process for using said rigid polyurethane foam, for example, as a heat insulator, for example, in refrigerators.

DESCRIPTION OF THE PREFERRED EMBODIMENTS

Figure 1A:
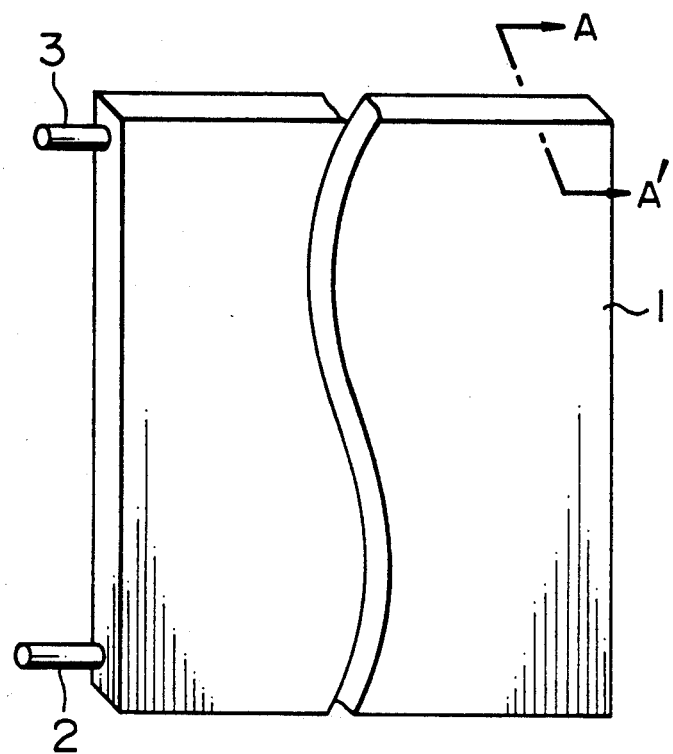
FIG. 1(a) is a perspective view of a hollow casing used for producing a heat insulator.

The present invention is characterized by using only water as a blowing agent. Heretofore, when only water was used as a blowing agent, the gas generated by the reaction of water with an isocyanate was only $CO_2$, which was included in the resulting foam. Since $CO_2$ had a larger thermal conductivity than trichloromonofluoromethane, heat insulating properties of the resulting foam were 1.4 to 1.5 times inferior to those of the foam obtained by using trichloromonofluoromethane. Further, since $CO_2$ gas was easily released through the polymer, changes with the lapse of time easily took place Further, dimensional stability, particularly at high temperatures, was no good so as to bring about shrinkage, so that it was impossible to use water alone as a blowing agent.

But according to the present invention, these defects are completely removed by using the special polyol component.

The special polyol component used in the present invention is a mixed polyol composition comprising
(a) 30 to 55% by weight of a polyether polyol obtained by adding ethylene oxide and propylene oxide to an aromatic amine,
(b) 10 to 20% by weight of a polyether polyol obtained by adding propylene oxide to an alcoholic amine,
(c) 5 to 15% by weight of a polyether polyol obtained by adding propylene oxide to an octafunctional polyol,
(d) 10 to 35% by weight of a polyether polyol obtained by adding propylene oxide to a tetrafunctional polyol,
(e) 0 to 15% by weight of a polyester polyol obtained by condensing diethylene glycol and dipropylene glycol with a polycarboxylic acid or an anhydride thereof, and
(f) 0 to 25% by weight of a polyether polyol obtained by adding ethylene oxide and propylene oxide to an aliphatic amine.

The aromatic amine includes, for example, tolylenediamine, phenylenediamine, xylylenediamine, naphthalenediamine, etc.

The alcoholic amine includes, for example, triethanolamine, diethanolamine, monoethanolamine, etc.

The octafunctional polyol includes, for example, sucrose, etc.

The tetrafunctional polyol includes, for example, methyl glucoside, pentaerythritol, etc.

The polycarboxylic acid and anhydride thereof includes, for example, phthalic anhydride, phthalic acid, adipic acid, succinic acid, succinic anhydride, maleic acid, maleic anhydride, etc.

The aliphatic amine includes, for example, ethylenediamine, diaminopropane, diaminobutane, tetramethylenediamine, pentamethylenediamine, hexamethylenediamine, etc.

Among these polyol components, a preferable mixed polyol composition comprises
(a) 30 to 55% by weight of a polyether polyol obtained by adding ethylene oxide and propylene oxide to tolylenediamine,
(b) 10 to 20% by weight of a polyether polyol obtained by adding propylene oxide to triethanolamine,
(c) 5 to 15% by weight of a polyether polyol obtained by adding propylene oxide to sucrose,
(d) 10 to 35% by weight of a polyether polyol obtained by adding propylene oxide to methyl glucoside,
(e) 0 to 15% by weight of a polyester polyol obtained by condensing diethylene glycol and dipropylene glycol with phthalic anhydride, and
(f) 0 to 25% by weight of a polyether polyol obtained by adding ethylene oxide and propylene oxide to ethylenediamine.

The mixed polyol composition preferably has an average OH value of 330 to 380. When the average OH value is less than 330, there is a tendency to lower dimensional stability. On the other hand, when the averge OH value is more than 380, there is a tendency to bring about undesirably friability.

In the mixed polyol composition, the individual polyol components seems to have the following effects:

The component (a) is effective for maintaining thermal conductivity.

The component (b) is effective for improving fluidity and adhesiveness.

The component (c) is effective for improving low-temperature dimensional stability, compression strength and mold releasing properties.

The component (d) is effective for preventing shrinkage at high temperatures.

The components (e) and (f) are effective for improving thermal conductivity and changes with the lapse of time.

Considering the foam density, thermal conductivity, dimensional stability, adhesiveness and mold releasing properties, the most preferable polyol composition comprises:
the component (a) in the range of 35–45% by weight, particularly 40% by weight,
the component (b) in the range of 10–14% by weight, particularly 12% by weight,
the component (c) in the range of 6–10% by weight, particularly 8% by weight,
the component (d) in the range of 15–25% by weight, particularly 20% by weight,
the component (e) in the range of 3–7% by weight, particularly 5% by weight, and
the component (f) in the range of 10–20% by weight, particularly 15% by weight.

The most preferable average OH value is 350.

As the isocyanate component, there can be used diphenylmethane diisocyanate, polymethylene polyphenyl isocyanate, tolylene diisocyanate, tolidine diisocyanate, xylene diisocyanate, naphthalene diisocyanate, hexamethylene diisocyanate, isophorone diisocyanate, dicyclohexylmethane diisocyanate, triphenylmethane triisocyanate, etc., modified isocyanates obtained by modifying these isocyanates partially with various methods and various compounds such as sucrose, methyl glucoside, pentaerythritol, trimethylolpropane, glycerin, propylene glycol, ethylene glycol, etc. These isocyanate compounds can be used alone or as a mixture thereof.

The isocyanate compound is used preferably in an amount so as to make the ratio of NCO of isocyanate to OH of polyol, i.e., NCO/OH, in the range of 1.00 to 1.20, most preferably NCO/OH=1.0.

In the present invention, only water is used as the blowing agent. The water is preferably used in an amount of 4 to 7 parts by weight, more preferably 5 to 6 parts by weight, per 100 parts by weight of the polyol component. If the amount of water is too small, the density of the rigid polyurethane foam extremely increases, resulting in raising the production cost undesirably. On the other hand, if the amount of water is too much, the friability undesirably increases too much.

As the reaction catalyst, there can be used tertiary amines such as tetramethylhexamethylenediamine, trimethylaminoethylpiperadine, pentamethyldiethylenetriamine, triethylenediamine, dimethylethanolamine, tetramethylpropylenediamine, dimethylcyclohexylamine, tetramethylethylenediamine, bis(2-dimethylaminothyl) ether, dimethylbenzylamine, methylmorpholine, ethylmorpholine, etc. The reaction catalyst is used in an amount of preferably 0.3 to 4 parts by weight per 100 parts by weight of the polyol component As the foam stabilizer, there can be used conventionally used organosilicon compounds, fluorine-containing surface active agents, cationic surface active agents, anionic surface active agents, nonionic surface active agents, etc. The foam stabilizer is used in an amount of preferably 0.5 to 5 parts by weight, more preferably 1.5 to 3 parts by weight, per 100 parts by weight of the polyol component.

The composition for producing rigid polyurethane foams may further contain one or more conventional additives such as fire retardants, fillers, reinforcing fibers, colorants, etc.

Rigid polyurethane foams can be produced by a one-shot process, a semi-prepolymer process, a prepolymer process, a spray process and other suitable methods. Among them, the one-shot process is preferred.

Foaming can be carried out by using a conventional foaming machine, for example, Model PU-30 manufactured by Promat AG. Foaming conditions slightly change depending on the kind of foaming machine used but usually are as follows:

| | |
|---|---|
| liquid temperature: | 25–40° C. |
| pouring pressure: | 80–150 kg/cm$^2$ |
| pouring amount: | 15–30 kg/min |
| mold temperature: | 40–50° C. |

More preferable foaming conditions are as follows:

| | |
|---|---|
| liquid temperature: | 30° C. |
| pouring pressure: | 120 kg/cm$^2$ |
| pouring amount: | 25 kg/min |
| mold temperature: | 45° C. |

The thus produced rigid polyurethane foams have a density of 23 to 27 kg/m$^3$ in terms of free foam density and a thermal conductivity of $18.0-19.0 \times 10^{-3}$ kcal/m·hr·° C. The dimensional stability is the same as that of conventional rigid polyurethane foams and the changing rate after allowed to stand for 2 months is 1.5% or less, or 3.0% or less even under worse conditions, either at a high-temperature side (70° C.) or a low-temperature side (−20° C.). The compression strength is 1.4 kg/cm$^2$ or more. Further, the adhesiveness and mold releasing properties are the same as those of conventional rigid polyurethane foams.

Thus, the rigid polyurethane foams of the present invention can be used not only as a heat insulator for refrigerators but also as a heat insulator for other electric machines, building structures, vehicles, etc., or as heat insulating molded articles. In addition to the use as a heat insulator, the rigid polyurethane foams of the present invention can be effectively used as a material for various types of buoyant articles such as buoys for fishery by making use of their small specific gravity and rigidity.

The present invention is illustrated by way of the following Examples and Comparative Examples, in which all parts and percents are by weight unless otherwise specified.

COMPARATIVE EXAMPLES 1 AND 2

Using 100 parts of polyol component having an average OH value of 450 to 480 as shown in Table 1 (EO = ethylene oxide, PO = propylene oxide), 1.5 parts of water and 48 parts of trichloromonofluoromethane (R-11, a trade name, mfd. by E. I. DuPont De Nemours & Co., Inc.) as a blowing agent (in Comparative Example 1, 6 parts of only water), 2.5 parts of a 2:1 mixture of tetramethylhexamethylenediamine (Kao Lizer No. 1, a trade name, mfd. by Kao Corp.) and trimethylaminoethylpiperadine (Kao Lizer No. 8, a trade name, mfd. by Kao Corp.) as a reaction catalyst, 1.5 parts of an organosilicon compound (L-5340, mfd. by Nippon Unikar Co.) as a foam stabilizer, and a necessary amount of diphenylmethane diisocyanate (44V20, a trade name, mfd. by Sumitomo Bayer Urethane Co., Ltd.) so as to make NCO/OH ratio 1.10, a rigid polyurethane foam was produced after foaming and curing.

COMPARATIVE EXAMPLE 3, EXAMPLES 1 to 12

Foaming and curing were carried out by using 100 parts of polyol components having an average OH value of 330–380 listed in Table 1 (EO = ethylene oxide, PO = propylene oxide, DEG = diethylene glycol, DPG = dipropylene glycol), 5.5, 4 and 7 parts of water as a blowing agent, 0.5 to 2 parts of a 2:2:1 mixture of tetramethylhexamethylenediamine (Kao Lizer No. 1, a trade name, mfd. by Kao Corp.), trimethylaminoethylpiperadine (Kao Lizer No. 8, a trade name, mfd. by Kao Corp.) and pentamethyldiethylenetriamine (Kao Lizer No. 3, a trade name, mfd. by Kao Corp.) as a reaction catalyst, 2 parts of an organosilicon compound (SH-193, a trade name, mfd. by Toray Industries, Inc.) as a foam stabilizer, and a necessary amount of diphenylmethane diisocyanate as an isocyanate component (44V20, a trade name, mfd. by Sumitomo Bayer Urethane Co., Ltd.) so as to make NCO/OH ratio 1.10.

Properties of the resulting rigid polyurethane foams were examined and listed in Table 1. The properties were determined as follows.

(1) Free foam density

Density (kg/m$^3$) of a foam obtained by foaming in a mold of 200×200×200 mm in inside dimensions made of a veneer board.

(2) Panel foam density

Density (kg/m$^3$) of a foam obtained by foaming in a mold of 400×600×35 mm in inside dimensions made of Al at mold temperature of 40° C.

(3) Rate of low-temperature dimensional change

The rate of change in thickness direction of a panel foam of 400×600×35 mm after standing at −20° C. for 2 months.

(4) Rate of high-temperature dimensional change

The rate of change in thickness direction of a panel foam of 400×600×35 mm after standing at 70° C. for 2 months.

(5) Friability

Measured according to the method of ASTM C-421-61.

Friability is an item for evaluation for knowing "fragility" or brittleness of rigid polyurethane foams. The smaller the value of friability becomes, the less the surface wear amount becomes and the better the adhesiveness becomes.

(6) Thermal conductivity

Thermal conductivity of a panel foam of 200×200×50 mm was measured at an average temperature of 23.8° C. by using Anacon Model 88.

(7) Compression strength

Foam strength when a foam of 50 mm in diameter and 35 mm in thickness was compressed by 10%.

(8) Mold release time

The time from the beginning of pouring of a liquid composition into a mold till removal of the resulting foam from the mold.

Comparative Example 2 uses the same polyol components and isocyanate component as used in Comparative Example 1, but uses only water as a blowing agent. Comparing with Comparative Example 1, the friability is larger and the mold release time is longer. Thus, the properties are greatly deteriorated compared with Comparative Example 1.

Comparative Example 3 contains the polyol components (a), (b) and (c), but does not contain either the polyol component (d), (e) or (f). The friability is improved remarkably, but shrinkage at high temperatures (rate of high-temperature dimensional change) is undesirably large.

In contrast, in Examples 1 to 12 wherein the mixed polyol composition of the present invention is used, the thermal conductivity is $18.2-19.0\times10^{-3}$ kcal/m·hr·° C. satisfying the object of the present invention. Fur-

TABLE 1

| Example No. | Comparative Example | | | Example | | | |
|---|---|---|---|---|---|---|---|
| | 1 | 2 | 3 | 1 | 2 | 3 | 4 |
| Polyol | | | | | | | |
| (a) Tolylenediamine + EO/PO (%) | 65 | 65 | 65 | 50 | 45 | 45 | 44 |
| (b) Triethanolamine + PO (%) | — | — | 20 | 15 | 15 | 20 | 13 |
| (c) Sucrose + PO (%) | 6 | 6 | 15 | 15 | 10 | 5 | 8 |
| (d) Methyl glucoside + PO (%) | — | — | — | 10 | 20 | 25 | 20 |
| (e) Phthalic anhydride + DEG/DPG (%) | — | — | — | 10 | 10 | 5 | 15 |
| (f) Ethylenediamine + EO (%) | — | — | — | — | — | — | — |
| (g) Propylene glycol + EO/PO (%) | 15 | 15 | — | — | — | — | — |
| (h) Diethanolamine + PO (%) | 14 | 14 | — | — | — | — | — |
| Blowing agent | | | | | | | |
| Water (parts) | 1.5 | 6.0 | 5.5 | 5.5 | 5.5 | 5.5 | 5.5 |
| Trichloromonofluoromethane (parts) | 48 | — | — | — | — | — | — |
| Properties | | | | | | | |
| Free foam density (kg/m3) | 21.2 | 23.2 | 25.5 | 25.3 | 25.3 | 25.5 | 25.2 |
| Panel foam density (kg/m3) | 28.9 | 34.2 | 36.5 | 37.2 | 37.1 | 37.2 | 36.9 |
| Rate of low-temperature dimensional change (%) | −1.2 | −1.7 | −1.5 | −1.1 | −1.0 | −1.4 | −1.5 |
| Rate of high-temperature dimensional change (%) | 2.1 | −30.0 | −18.6 | −2.1 | −1.5 | −1.5 | −2.5 |
| Friability (%) | 9 | 19 | 8 | 10 | 9 | 9 | 10 |
| Thermal conductivity (10-3 kcal/m · hr · °C.) | 13.5 | 19.5 | 19.4 | 18.2 | 18.5 | 18.6 | 18.2 |
| Compression strength (kg/cm$^2$) | 0.9 | 1.3 | 1.3 | 1.5 | 1.5 | 1.6 | 1.5 |
| Mold release time (min) | 5 | 10 | 6 | 5 | 5 | 6 | 6 |

| Example No. | Example | | | | | | | |
|---|---|---|---|---|---|---|---|---|
| | 5 | 6 | 7 | 8 | 9 | 10 | 11 | 12 |
| Polyol | | | | | | | | |
| (a) Tolylenediamine + EO/PO (%) | 55 | 33 | 40 | 35 | 30 | 40 | 40 | 40 |
| (b) Triethanolamine + PO (%) | 15 | 10 | 12 | 10 | 10 | 10 | 12 | 12 |
| (c) Sucrose + PO (%) | 10 | 7 | 8 | 5 | 5 | 5 | 8 | 8 |
| (d) Methyl glucoside + PO (%) | 20 | 30 | 20 | 35 | 30 | 25 | 20 | 20 |
| (e) Phthalic anhydride + DEG/DPG (%) | — | — | 5 | — | — | 10 | 5 | 5 |
| (f) Ethylenediamine + EO (%) | — | 20 | 15 | 15 | 25 | 10 | 15 | 15 |
| (g) Propylene glycol + EO/PO (%) | — | — | — | — | — | — | — | — |
| (h) Diethanolamine + PO (%) | — | — | — | — | — | — | — | — |
| Blowing agent | | | | | | | | |
| Water (parts) | 5.5 | 5.5 | 5.5 | 5.5 | 5.5 | 5.5 | 4.0 | 7.0 |
| Trichloromonofluoromethane (parts) | — | — | — | — | — | — | — | — |
| Properties | | | | | | | | |
| Free foam density (kg/m3) | 26.0 | 24.9 | 24.9 | 25.3 | 24.7 | 25.0 | 27.8 | 22.1 |
| Panel foam density (kg/m3) | 38.1 | 36.0 | 36.1 | 36.3 | 35.5 | 36.2 | 39.5 | 33.4 |
| Rate of low-temperature dimensional change (%) | −0.9 | −0.9 | −0.8 | −1.2 | −1.3 | −1.2 | −0.5 | −1.5 |
| Rate of high-temperature dimensional change (%) | −1.3 | −1.3 | −1.2 | −1.2 | −1.5 | −1.6 | −0.8 | −2.1 |
| Friability (%) | 11 | 8 | 8 | 10 | 8 | 9 | 7 | 12 |
| Thermal conductivity (10-3 kcal/m · hr · °C.) | 19.0 | 18.4 | 18.3 | 18.7 | 18.9 | 18.4 | 18.6 | 18.2 |
| Compression strength (kg/cm$^2$) | 1.7 | 1.6 | 1.6 | 1.5 | 1.4 | 1.5 | 1.9 | 1.2 |
| Mold release time (min) | 6 | 5 | 5 | 6 | 5 | 6 | 5 | 6 |

As shown in Table 1, Comparative Example 1 is a typical example of known polyurethane foam wherein known polyol components, and water and trichloromonofluoromethane as a blowing agent were used.

ther, the rate of high-temperature dimensional change is remarkably improved to 1.2 to 2.5%, which values are almost equal to Comparative Example 1. Moreover, the rate of low-temperature dimensional change, friability, compression strength and mold release time are as excellent as Comparative Example 1. Particularly, Example 7 wherein the mixed polyol composition comprises 40% of the component (a), 12% of the component (b), 8% of the component (c), 20% of the component (d), 5% of the component (e) and 15% of the component (f), shows the best balanced properties of foam density (including both the free foam density and the panel foam density), thermal conductivity, rates of low-temperature and high-temperature dimensional changes, friability, compression strength and mold release time.

As shown in Examples 1 to 12, even if only water is used as a blowing agent, by using the special mixed polyol composition, the thermal conductivity becomes $19.0 \times 10^{-3}$ kcal/m·hr·° C. or less and rigid polyurethane foams having excellent properties comparable to those of known rigid polyurethane foams including the dimensional stability can be obtained. Thus, such rigid polyurethane foams can be used effectively as a heat insulator. Further, the use of CFC which is an object of preventing air pollution can completely be removed.

EXAMPLE 13

FIG. 1 illustrates an example of application of the rigid polyurethane foam of the present invention as a heat insulator used for constituting a wall of a building, casing of a refer or the like.

Figure 1B:
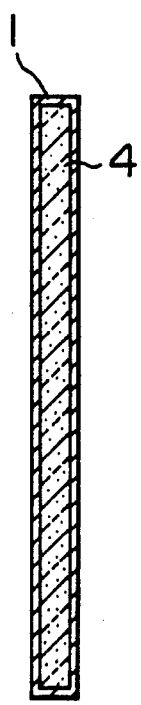
FIG. 1(b) is a sectional view taken along the line A—A'.

As shown in FIG. 1(a), a mixed solution containing the starting component materials for forming a rigid polyurethane foam such as used in Examples 1 to 12 was poured into a flat hollow casing 1 made of a metal plate such as aluminum plate from a pouring head 2, and then foamed and cured in the same manner as in Examples 1 to 12 to form an insulating casing having the sectional shape shown in FIG. 1(b). FIG. 1(b) shows a section presented when the casing is cut along the line A—A' of FIG. 1(a). In FIG. 1(b), the hollow portion of the casing is packed with the rigid polyurethane foam 4 formed by the foaming and curing. In the pouring of said mixed solution into hollow casing 1, although not shown in the drawing, a plurality of similar hollow casings are arranged side by side in a thermostatic chamber kept at 35° to 45° C., and after a determined amount of said mixed solution has been poured into each casing, the pouring head 2 was closed. Opening 3 is a gas vent during the time when the mixed solution is being poured into the casing. It also serves as a gas vent during the foaming and curing operations. The thus obtained heat insulating casing can be effectively applied as a wall material for buildings such as houses, a heat insulator consisting the outer wall of a reefer and the like, and for other purposes for which the rigid polyurethane foams have been generally used.

EXAMPLE 14

Figure 2:
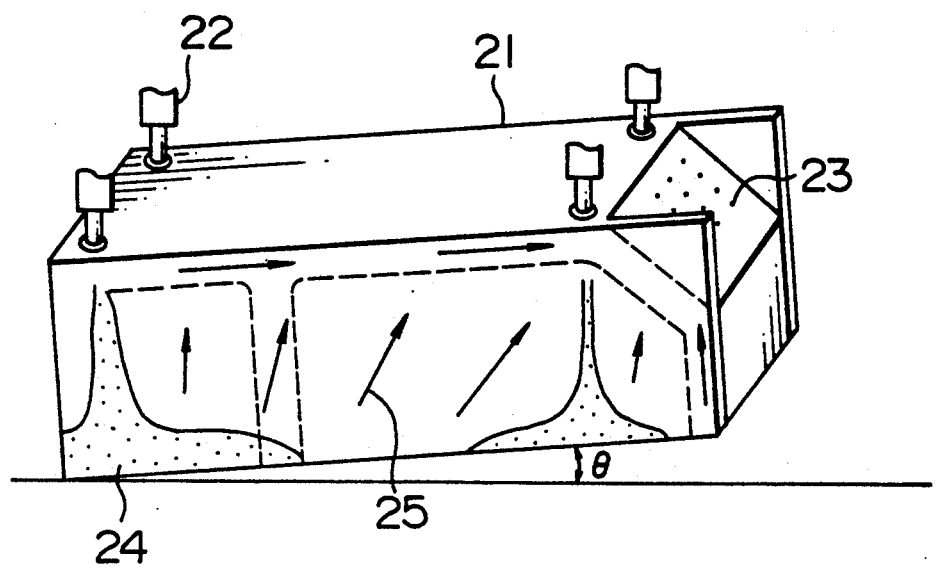
FIG. 2 is a perspective view of a refrigerator wherein a rigid polyurethane foam is to be packed in an outer case of the refrigerator.

FIG. 2 illustrates an example of application of the rigid polyurethane foam of the present invention as a heat insulator to be packed in an outer case of a refrigerator. That is, FIG. 2 is by way of illustration and shows schematically the way of packing the hollow portion of an outer case 21 of a refrigerator with rigid polyurethane foam 24.

The procedure for the packing with the rigid polyurethane foam is composed of the following steps.

(1) The refrigerator outer case 21 is properly set in a foaming device (not shown) which has been heated to 35° to 45° C., at an angle of inclination $\theta$ of 10° to 20°.

(2) A stack solution of rigid polyurethane foam, which has been adjusted to a temperature of 30° C. is poured into the case from the pouring heads 22.

(3) The solution poured into the case is foamed and fills up the refrigerator outer case 21.

(4) After the pouring and the foaming of the stock solution, the foam is after-cured and then released from the mold after about 5 minutes.

In FIG. 2, arrows 25 indicate the direction of flow of the stock solution of rigid polyurethane foam, and numeral 23 denotes gas vents. The refrigerator outer case 21 is held inclined at an angle of $\theta$ by taking into consideration the gas vents and the flowing direction of the stock solution of rigid polyurethane foam. Thus, by using the same stock solution (mixed solution) for rigid polyurethane foam as used in Examples 1 to 10 and by performing foaming and curing in the same manner as in Examples 1 to 12, there can be produced a refrigerator outer case packed with a rigid polyurethane foam having the excellent property values shown in Table 1.

As described above in detail, according to the present invention, a rigid polyurethane foam not at all inferior to conventional products in properties such as insulating properties can be realized without using fluorocarbon blowing agents (including substitutes therefor) such as trichloromonofluoromethane, etc., which have been used as major blowing agents, but using only water as a blowing agent. Thus, according to the present invention, the use of CFC which is an object of the air pollution control can completely be removed and a fear of destroying the ozone layer completely disappears. The present invention has a very important significance from the viewpoint of preventing the environmental pollution.

We claim:

1. A rigid polyurethane foam produced by reacting a polyol component with an isocyanate component using only water as a blowing agent, said polyol component being a mixed polyol composition consisting of
   (a) 30 to 55% by weight of a polyether polyol obtained by adding ethylene oxide and propylene oxide to an aromatic amine selected from the group consisting of tolylenediamine, phenylenediamine, xylylenediamine and naphthalenediamine,
   (b) 10 to 20% by weight of a polyether polyol obtained by adding propylene oxide to an alcoholic amine selected from the group consisting of triethanolamine, diethanolamine and monoethanolamine,
   (c) 5 to 15% by weight of a polyether polyol obtained by adding propylene oxide to sucrose,
   (d) 10 to 35% by weight of a polyether polyol obtained by adding propylene oxide to a tetrafunctional polyol selected from the group consisting of methyl glucoside and pentaerythritol,
   (e) 0 to 15% by weight of a polyester polyol obtained by condensing diethylene glycol and dipropylene glycol with a polycarboxylic acid or an anhydride thereof selected from the group consisting of phthalic anhydride, phthalic acid, adipic acid, succinic acid, succinic anhydride, maleic acid and maleic anhydride, and
   (f) 0 to 25% by weight of a polyether polyol obtained by adding ethylene oxide and propylene oxide to an aliphatic amine selected from the group consisting of ethylenediamine, diaminopropane, diaminobutane, tetramethylenediamine, pentamethylenediamine and hexamethylenediamine.

2. A rigid polyurethane foam according to claim 1, wherein the mixed polyol composition has an average OH value of 330 to 380.

3. A rigid polyurethane foam according to claim 1, wherein the ratio of NCO of the isocyanate component to OH of the polyol component, NCO/OH, is 1.00 to 1.20.

4. A rigid polyurethane foam according to claim 1, wherein the water is used in an amount of 4 to 7 parts by weight per 100 parts by weight of the polyol component.

5. A rigid polyurethane foam produced by reacting a polyol component with an isocyanate component using only water as a blowing agent, said polyol component being a mixed polyol composition consisting of
   (a) 30 to 55% by weight of a polyether polyol obtained by adding ethylene oxide and propylene oxide to tolylenediamine,
   (b) 10 to 20% by weight of a polyether polyol obtained by adding propylene oxide to triethanolamine,
   (c) 5 to 15% by weight of a polyether polyol obtained by adding propylene oxide to sucrose,
   (d) 10 to 35% by weight of a polyether polyol obtained by adding propylene oxide to methyl glucoside,
   (e) 0 to 15% by weight of a polyester polyol obtained by condensing diethylene glycol and dipropylene glycol with a phthalic anhydride, and
   (f) 0 to 25% by weight of a polyether polyol obtained by adding ethylene oxide and propylene oxide to ethylenediamine.

6. A rigid polyurethane foam according to claim 5, wherein the mixed polyol composition has an average OH value of 330 to 380.

7. A rigid polyurethane foam according to claim 5, wherein the ratio of NCO of the isocyanate component to OH of the polyol component, NCO/OH, is 1.00 to 1.20.

8. A rigid polyurethane foam according to claim 5, wherein the water is used in an amount of 4 to 7 parts by weight per 100 parts by weight of the polyol component.

9. A rigid polyurethane foam produced by reacting a polyol component with an isocyanate component using only water as a blowing agent, said polyol cmoponent being a mixed polyol composition consisting of
   (a) 35 to 45% by weight of a polyether polyol obtained by adding ethylene oxide and propylene oxide to tolylenediamine,
   (b) 10 to 14% by weight of a polyether polyol obtained by adding propylene oxide to triethanolamine,
   (c) 6 to 10% by weight of a polyether polyol obtained by adding propylene oxide to sucrose,
   (d) 15 to 25% by weight of a polyether polyol obtained by adding propylene oxide to methyl glucoside,
   (e) 3 to 7% by weight of a polyester polyol obtained by condensing diethylene glycol and dipropylene glycol with a phthalic anhydride, and
   (f) 10 to 20% by weight of a polyether polyol obtained by adding ethylene oxide and propylene oxide to ethylenediamine.

10. A rigid polyurethane foam according to claim 9, wherein the mixed polyol composition has an average OH value of 350.

11. A rigid polyurethane foam according to claim 9, wherein the ratio of NCO of the isocyanate component to OH of the polyol component, NCO/OH, is 1.10.

12. A rigid polyurethane foam according to claim 9, wherein the water is used in an amount of 5 to 6 parts by weight per 100 parts by weight of the polyol component.

13. A process for producing a rigid polyurethane foam which comprises reacting a polyol component with an isocyanate component using only water as a blowing agent, said polyol component being a mixed polyol composition consisting of
   (a) 30 to 55% by weight of a polyether polyol obtained by adding ethylene oxide and propylene oxide to an aromatic amine,
   (b) 10 to 20% by weight of a polyether polyol obtained by adding propylene oxide to an alcoholic amine,
   (c) 5 to 15% by weight of a polyether polyol obtained by adding propylene oxide to an octafunctional polyol,
   (d) 10 to 35% by weight of a polyether polyol obtained by adding propylene oxide to a tetrafunctional polyol,
   (e) 0 to 15% by weight of a polyester polyol obtained by condensing diethylene glycol and dipropylene glycol with a polycarboxylic acid or an anhydride thereof, and
   (f) 0 to 25% by weight of a polyether polyol obtained by adding ethylene oxide and propylene oxide to an aliphatic amine.

14. A process according to claim 13, wherein the mixed polyol composition has an average OH value of 330 to 380.

15. A process according to claim 13, wherein the ratio of NCO of the isocyanate component to OH of the polyol component, NCO/OH, is 1.00 to 1.20.

16. A process according to claim 13, wherein the water is used in an amount of 4 to 7 parts by weight per 100 parts by weight of the polyol component.

17. A process for producing a rigid polyurethane foam which comprises reacting a polyol component with an isocyanate component in the presence of only water as a blowing agent, said polyol component being a mixed polyol composition consisting of
   (a) 30 to 55% by weight of a polyether polyol obtained by adding ethylene oxide and propylene oxide to an aromatic amine,
   (b) 10 to 20% by weight of a polyether polyol obtained by adding propylene oxide to triethanolamine,
   (c) 5 to 15% by weight of a polyether polyol obtained by adding propylene oxide to sucrose,
   (d) 10 to 35% by weight of a polyether polyol obtained by adding propylene oxide to methyl glucoside,
   (e) 0 to 15% by weight of a polyester polyol obtained by condensing diethylene glycol and dipropylene glycol with phthalic anhydride, and
   (f) 0 to 25% by weight of a polyether polyol obtained by adding ethylene oxide and propylene oxide to ethylenediamine.

18. A process according to claim 17, wherein the mixed polyol composition has an average OH value of 330 to 380.

19. A process according to claim 17, wherein the ratio of NCO of the isocyanate component to OH of the polyol component, NCO/OH, is 1.00 to 1.20.

20. A process according to claim 17, wherein the water is used in an amount of 4 to 7 parts by weight per 100 parts by weight of the polyol component.

21. A process for using the rigid polyurethane foam of claim 1 as a heat insulator.

22. A process for using the rigid polyurethane foam of claim 1 as a heat insulator in a refrigerator.

23. A process for using the rigid polyurethane foam of claim 5 as a heat insulator.

24. A process for using the rigid polyurethane foam of claim 5 as a heat insulator in a refrigerator.

25. A process for using the rigid polyurethane foam of claim 9 as a heat insulator.

26. A process for using the rigid polyurethane foam of claim 9 as a heat insulator in a refrigerator.

* * * * *